(12) United States Patent
Bookbinder et al.

(10) Patent No.: US 11,105,998 B2
(45) Date of Patent: Aug. 31, 2021

(54) SUPER-ABSORBENT SWELLABLE HOT MELT COATED OPTICAL FIBERS, BUFFER TUBES, CABLE DESIGNS THEREOF AND MANUFACTURING PROCESSES

(71) Applicant: CORNING RESEARCH & DEVELOPMENT CORPORATION, Corning, NY (US)

(72) Inventors: Dana Craig Bookbinder, Corning, NY (US); Ruchi Tandon, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/686,290

(22) Filed: Nov. 18, 2019

(65) Prior Publication Data

US 2020/0088967 A1 Mar. 19, 2020

Related U.S. Application Data

(63) Continuation of application No. PCT/US2018/034686, filed on May 25, 2018.

(60) Provisional application No. 62/513,033, filed on May 31, 2017.

(51) Int. Cl.
 *G02B 6/44* (2006.01)
(52) U.S. Cl.
 CPC ........... *G02B 6/4494* (2013.01); *G02B 6/441* (2013.01)
(58) Field of Classification Search
 None
 See application file for complete search history.

(56) References Cited

U.S. PATENT DOCUMENTS

| 5,029,974 A | 7/1991 | Nilsson |
| 5,925,461 A * | 7/1999 | Fairgrieve ............ G02B 6/4434 |
| | | 428/372 |
| 6,284,367 B1 | 9/2001 | Gruhn et al. |
| (Continued) | | |

FOREIGN PATENT DOCUMENTS

| EP | 1170614 A1 * | 1/2002 | ........... G02B 6/4494 |
| EP | 1944637 A2 | 7/2008 | |

OTHER PUBLICATIONS

International Search Report and Written Opinion of the International Searching Authority; PCT/US2018/34686; dated Aug. 27, 2018; 10 Pages; ISA/US Commissioner for Patents.

(Continued)

*Primary Examiner* — Tina M Wong
(74) *Attorney, Agent, or Firm* — William D. Doyle (57) ABSTRACT

Embodiments of an optical fiber cable are provided. The cable includes a cable jacket and at least one buffer tube. Each buffer tube surrounds a plurality of optical fibers. The cable jacket surrounds the at least one buffer tube. Further, a coating of superabsorbent, swellable hot melt is applied to at least one of the following locations: (i) along at least a portion of the length of at least one of the plurality of optical fibers; (ii) along at least a portion of the length of the exterior or interior surface of the at least one buffer tube; or (iii) along at least a portion of the length of the interior surface of the cable jacket. Moreover, the superabsorbent, swellable hot melt is capable of absorbing at least 50 g of water per gram of superabsorbent, swellable hot melt.

13 Claims, 4 Drawing Sheets

(56) References Cited

U.S. PATENT DOCUMENTS

| | | |
|---|---|---|
| 6,463,199 B1 | 10/2002 | Quinn et al. |
| 6,677,394 B1 | 1/2004 | Butterbach et al. |
| 6,803,400 B1 | 10/2004 | Butterbach et al. |
| 7,910,645 B2 | 3/2011 | Ahmed et al. |
| 7,936,957 B1 | 5/2011 | Puzan et al. |
| 7,994,233 B2 | 8/2011 | Mehawej et al. |
| 2002/0039869 A1* | 4/2002 | Achille .................. A61L 15/48 442/417 |
| 2002/0137837 A1 | 9/2002 | Flautt et al. |
| 2005/0013573 A1 | 1/2005 | Lochkovic et al. |
| 2009/0003780 A1 | 1/2009 | Bringuier et al. |
| 2009/0003785 A1 | 1/2009 | Parris et al. |
| 2012/0027366 A1 | 2/2012 | Parris et al. |
| 2014/0023330 A1* | 1/2014 | Blew .................... G02B 6/4436 385/113 |
| 2015/0110451 A1 | 4/2015 | Blazer et al. |
| 2015/0268427 A1* | 9/2015 | Register, III ......... G02B 6/4434 385/110 |
| 2017/0139167 A1 | 5/2017 | Blazer et al. |
| 2018/0181564 A1* | 6/2018 | Sugihara ................ G06F 16/907 |
| 2019/0049681 A1* | 2/2019 | Bookbinder ......... G02B 6/4432 |
| 2019/0157798 A1* | 5/2019 | Bookbinder ....... H01R 13/5213 |
| 2020/0174209 A1* | 6/2020 | Weimann ............... G02B 6/441 |
| 2020/0301087 A1* | 9/2020 | Heinz .................. G02B 6/4436 |

OTHER PUBLICATIONS

Extended Supplementary European Search Report and Search Opinion; 18808979.1; dated May 4, 2021; 9 pages; European Patent Office.

* cited by examiner

SUPER-ABSORBENT SWELLABLE HOT MELT COATED OPTICAL FIBERS, BUFFER TUBES, CABLE DESIGNS THEREOF AND MANUFACTURING PROCESSES

PRIORITY APPLICATIONS

This application is a continuation of International Application No. PCT/US18/34686, filed on May 25, 2018, which claims the benefit of priority to U.S. Application No. 62/513,033, filed on May 31, 2017, both applications being incorporated herein by reference.

BACKGROUND

The disclosure relates generally to cables and more particularly to optical fiber cables having a coating of superabsorbent, swellable hot melt on at least one of the interior of a cable jacket, the interior or exterior of a buffer tube, or along the length of an optical fiber. Optical cables have seen increased use in a wide variety of field's including various electronics and telecommunications fields. Optical cables contain or surround one or more optical fibers. The cable provides structure and protection for the optical fibers within the cable.

SUMMARY

In one aspect, embodiments of an optical fiber cable are provided. The optical fiber cable includes a cable jacket having an exterior surface and an interior surface and at least one buffer tube. Each of the at least one buffer tube has an exterior surface and an interior surface, and each of the at least one buffer tube surrounds a plurality of optical fibers. The cable jacket surrounds the at least one buffer tube. Further, a coating of superabsorbent, swellable hot melt is applied to at least one of the following locations: (i) along at least a portion of the length of at least one of the plurality of optical fibers; (ii) along at least a portion of the length of the exterior or interior surface of the at least one buffer tube; or (iii) along at least a portion of the length of the interior surface of the cable jacket. Moreover, the superabsorbent, swellable hot melt is capable of absorbing at least 50 g of water per gram of superabsorbent, swellable hot melt.

In another aspect, embodiments of a method of fabricating an optical fiber cable are provided. The method includes the steps of applying a coating of superabsorbent, swellable hot melt along at least a portion of a length of an optical fiber and arranging within a buffer tube a plurality of optical fibers. At least one of the plurality of optical fibers is an optical fiber having the coating. Further, the optical fibers are arranged such that a gap between any two adjacent optical fibers is less than a diameter of any one of the plurality of optical fibers.

In still another aspect, embodiments of another optical fiber cable are provided. The optical fiber cable includes a cable jacket having an exterior surface and an interior surface and at least one buffer tube. Each of the at least one buffer tube has an exterior surface and an interior surface, and the at least one buffer tube is surrounded by the outer cable jacket. The optical fiber cable also includes a plurality of optical fiber ribbons arranged in a stack within each of the at least one buffer tube. Each of the optical fiber ribbons includes a plurality of optical fibers surrounded by and supported within a polymeric ribbon matrix. Further, a coating of superabsorbent, swellable hot melt is applied to at least one of the following locations: (i) along at least a portion of the length of at least one of the plurality of optical fiber ribbons; (ii) along at least a portion of the length of the exterior or interior surface of the at least one buffer tube; or (iii) along at least a portion of the length of the interior surface of the cable jacket. The superabsorbent, swellable hot melt is capable of absorbing at least 50 g of water per gram of superabsorbent, swellable hot melt.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of an optical fiber cable having one or more cable component coated with superabsorbent, swellable hot melt (SA-SHM) are shown. In embodiments, the use of SA-SHM helps to alleviate issues with bend losses experienced by optical fiber cables in their various deployments, particularly those that utilize superabsorbent polymer particles. In particular, the SA-SHM is used as a coating on the inside of a optical fiber cable jacket, as a coating on or inside buffer tubes, as a coating along at least a portion of the length of at least one optical fiber, and/or as a coating on a least a portion of the length of at least one ribbon of an optical fiber cable. Furthermore, cables using the SA-SHM do not require superabsorbent polymer (SAP) powders, SAP tapes, and/or SAP yarns, which are a source of bend loss.

Figures 1, 2:
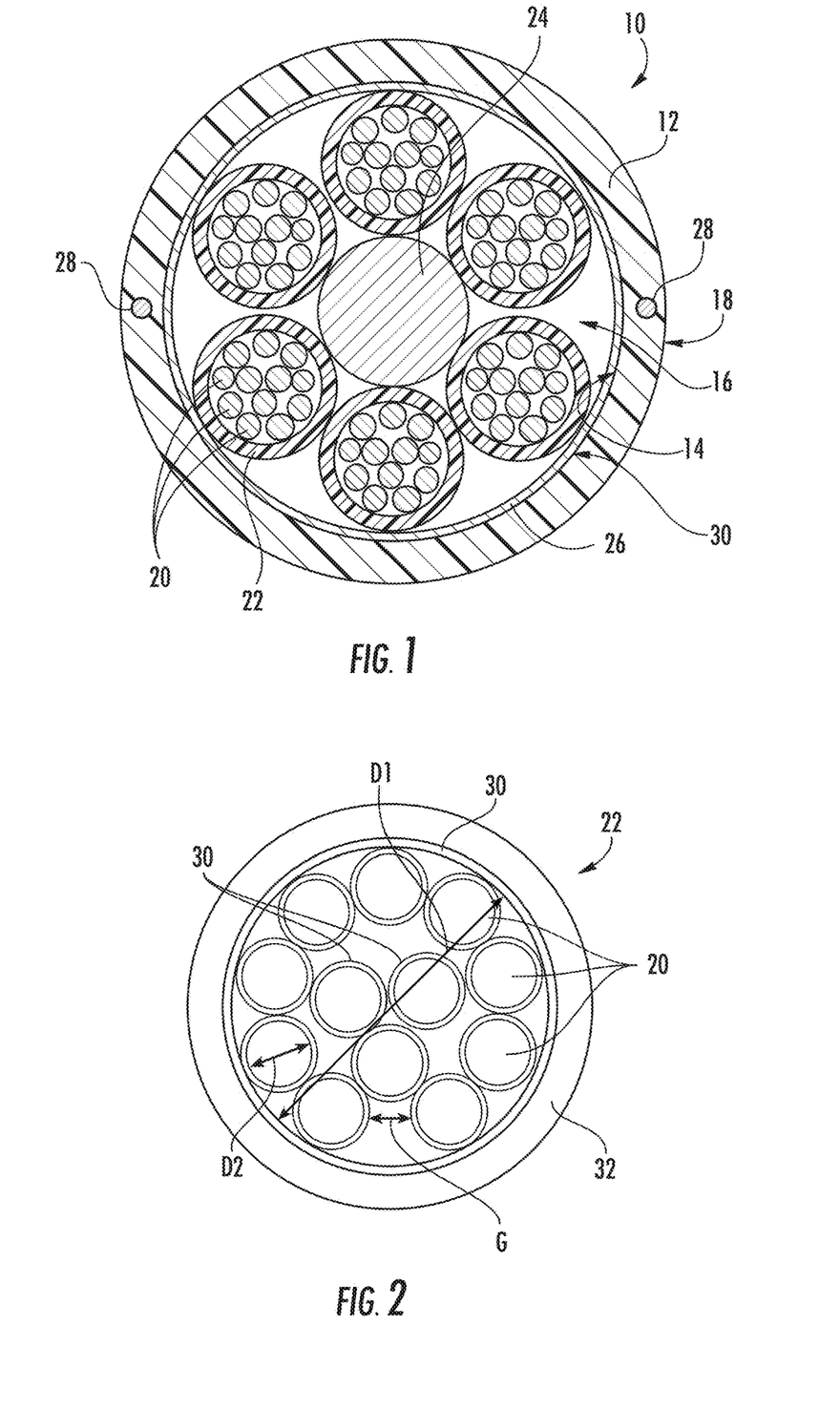
FIG. 1 is a cross-sectional view of an optical fiber cable usable with the superabsorbent, swellable hot melt (SA-SHM), according to an exemplary embodiment.
FIG. 2 is a cross-sectional view of a buffer tube having a lining of SA-SHM and containing optical fibers also having a coating of SA-SHM, according to an exemplary embodiment.

As shown in FIG. 1, an optical cable, shown as cable 10, is illustrated according to an exemplary embodiment. Cable 10 includes an outer cable jacket, shown as outer jacket 12, having an inner surface 14 that defines an inner passage or cavity, shown as central bore 16, and an outer surface 18 that generally defines the outermost surface of cable 10. As will be generally understood, inner surface 14 of jacket 12 defines an internal area or region within which the various cable components discussed herein are located.

In various embodiments, cable jacket 12 is formed from an extruded thermoplastic material, which is not a superabsorbent polymer material. In various embodiments, cable jacket 12 may be a variety of materials used in cable manufacturing such as polyethylene, medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Cable 10 includes one or more optical transmission elements or optical waveguides, shown as optical fibers 20. In the embodiment shown, groups of optical fibers 20 are located in separate buffer tubes 22, and buffer tubes 22 are wrapped (e.g., in an SZ stranding pattern) around a central strength member 24. In various embodiments, cable 10 includes at least four buffer tubes 22. Central strength member 24 may be any suitable axial strength member, such as a glass-reinforced plastic rod, steel rod/wire, etc. Generally, cable 10 provides structure and protection to optical fibers 20 during and after installation (e.g., protection during handling, protection from elements, protection from the environment, protection from vermin, etc.).

In various embodiments, cable 10 also includes an armor layer, shown as armor 26. In general, armor 26 is formed from a strip of metal material (e.g., a metal tape, a flat elongate continuous piece of material, etc.) that is wrapped around and circumferentially surrounds buffer tubes 22. As shown in FIG. 1, armor 26 is located adjacent to the inner surface 14 of outer jacket 12 such that these two layers are in contact with each other. In specific embodiments, armor 26 is corrugated steel tape material that is wrapped around the interior portions of cable 10, and in some of these embodiments, armor 26 is longitudinally folded forming a longitudinal overlapped section where opposing edges of the tape overlap to completely surround inner buffer tubes 22 (and any other interior component of cable 10). In other embodiments, armor 26 may be a strip of metal tape material, helically wrapped around buffer tubes 22 such that armor 26 forms a layer circumferentially surrounding buffer tubes 22. In general, armor layer 26 provides an additional layer of protection to fibers 20 within cable 10, and may provide resistance against damage (e.g., damage caused by contact or compression during installation, damage from the elements, damage from rodents, etc.). Cable 10 may include a variety of other components or layers, such as helically wrapped binders, circumferential constrictive thin-film binders, etc.

In the embodiment shown, cable 10 includes one or more preferential tear feature and/or ripcord 28 embedded in or underneath jacket 12. In this embodiment, the preferential tear feature and/or ripcord 28 is located within jacket 12 such that ripcord 28 facilitates opening of outer jacket 12. In some embodiments, ripcord 28 may be located within armor layer 26 such that ripcord 28 facilitates opening of both armor 26 and jacket 12.

In embodiments, cable 10, optical fibers 20 and buffer tube 22 are configured in various ways to provide a high fiber density and high fiber count cable while at the same time reducing or minimizing buffer tube size and/or cable jacket size. As discussed herein, low diameter optical fiber allows higher density and smaller cable, and the low bend loss design of these optical fibers allows such high density, small cables to have acceptable signal loss properties.

In addition, bend losses may be greater in cables in which optical fibers are densely packed in relatively rigid buffer tubes, are densely packed within a cable jacket and/or are densely packed in an optical fiber ribbon arrangement. Bend losses in such cables are caused, at least in part, by positional constraint resulting from the dense packing which limits the ability of optical fibers to shift to assume low strain positions during bending, compression, etc. For example, in certain optical fiber cables using SAP powder as a means to absorb water, the SAP powder particles can, in some circumstances, cause microbending of the optical fibers 20 particularly when the optical fibers 20 are densely packed, which can result in undesirable attenuation. That is, in some optical fiber cables, the geometry (generally, shard-like) and size (>100 microns) of the SAP powder particles can, in some circumstances, cause microbending in densely packed optic fibers and prevent the optical fibers from assuming low strain positions. Thus, typical optical fiber cable and/or buffer tube configurations include a significant amount of free-space between the outer surfaces of the optical fibers and the inner surface of the buffer tube or jacket, and this free-space allows the optical fibers to move or shift to assume low strain positions during bending. By reducing strain that the optical fibers experience during bending, such low density cables provide a satisfactory level of signal attenuation, but do so with a relatively large diameter buffer tube and/or relatively large cable jacket.

By comparison, in the embodiment depicted in FIG. 2, the buffer tube 22 surrounds densely packed optical fibers 20. In an embodiment, a diameter ratio parameter $\Omega$ is defined between the inner diameter D1 of the buffer 22 and an outer diameter D2 of each of N number of optical fibers 20 (i.e., $\Omega = D1/D2$). In a specific embodiment, the diameter ratio parameter $\Omega$ is selected such that $2.25 + 0.143(N) \leq \Omega \leq 1.14 + 0.313(N)$. In embodiments, the number N of optical fibers 20 is at least four. In specific embodiments, the number N of optical fibers 20 is 12, the inner diameter D1 of the buffer tube is 15 mm, and the outer diameter D2 of each optical fiber 20 is less than 210 microns and greater than 100 microns. In another embodiment in which the number N of optical fibers 20 is greater than 6, the diameter ratio parameter $\Omega$ is selected such that $\Omega \leq 2.66 + 0.134(N)$.

In still other embodiments, the optical fibers 20 are arranged in such a way that a gap G between adjacent optical fibers 20 is smaller than the diameter D2 of any individual optical fiber 20. Additionally, the gap between any optical fiber 20 and the interior surface of the buffer tube 22 is smaller than the diameter D2 of any individual optical fiber 20. That is, the optical fibers 20 are arranged within the buffer tube 22 in such a way that no space large enough to accommodate an additional optical fiber 20 is provided within the buffer tube 22.

The packing of the optical fibers 20 within the buffer tube in the previously described manners is facilitated by an SA-SHM coating 30 that is applied at least partially around and at least partially along the length of at least one of the optical fibers 20. Thus, while all of the optical fibers 20 of the embodiment depicted in FIG. 2 are depicted with the SA-SHM coating 30, embodiments exist where only one, two, three, etc. optical fibers 20 have the SA-SHM coating 30, and the remaining optical fibers 20 remain uncoated. In such embodiments, the SA-SHM coating 30 on only some of the optical fibers 20 is enough to provide water protection for all the optical fibers 20 within the buffer tube 22. Advantageously, the SA-SHM coating 30 does not contribute to microbending losses in the same manner as SAP powders, water blocking tapes or SAP tapes, and/or SAP yarns, which means that the optical fibers 20 can be placed closer together within the buffer tube 22 without the concern of providing a substantial amount of space for the optical fiber communication elements to move into low strain positions.

In other embodiments, the SA-SHM coating 30 is located on the interior surface of the buffer tube 22. In such an embodiment, the SA-SHM coating 30 can be applied to a bundle of optical fibers 20, such as by spraying, atomizing, dip-coating, extruding, fiberizing, etc. the SA-SHM coating 30 on the bundle of fibers 20 or by co-extruding the SA-SHM coating 30 with the buffer tube 22. In another embodiment, the SA-SHM coating 30 is located on the exterior surface of the buffer tube 22. In such an embodiment, the SA-SHM 30 can be applied to the exterior surface of the buffer tube 22 by spraying, atomizing, dip-coating, extruding, fiberizing, etc. or by co-extruding the SA-SHM coating 30 with the buffer tube 22. In still another embodiment, the SA-SHM coating 30 is applied to the interior surface 14 of the cable jacket 12, such as between the cable jacket 12 and the armor 26 (if included). In such an embodiment, the SA-SHM coating 30 can be applied to a bundle of buffer tubes 22, such as by spraying, atomizing, dip-coating, extruding, fiberizing, etc. the SA-SHM coating on the bundle of buffer tubes 22 or by co-extruding the SA-SHM coating 30 with the cable jacket 12.

Regardless of location, the SA-SHM coating 30 can have a thickness ti of up to 200 microns in some embodiments. In other embodiment, the SA-SHM coating 30 has a thickness of up to 50 microns, and in still other embodiments, the SA-SHM coating 30 has a thickness of up to 30 microns. The SA-SHM coating also has a thickness of at least 1 micron in embodiments.

The SA-SHM coating 30 can have various compositions. However, generally, the water absorption capacities of the SA-SHM coatings used in the embodiments of the optical fiber cables disclosed herein will be greater than 50 grams of water absorbed per gram of SHM coating. In other embodiments, the water absorption capacity of the SHM coating is greater than 100 gram of water absorbed per gram of SHM coating. In still other embodiments, the water absorption capacity of the SHM coating is greater than 150 grams of water absorbed per gram of SHM coating. In yet other embodiments, the water absorption capacity of the SHM coating is greater than 200 grams of water absorbed per gram of SHM coating.

In embodiments, the SA-SHM coating is comprised of a hot melt matrix in which one or more superabsorbent polymer powders are suspended. That is, the superabsorbent polymer powders are distributed throughout the thickness of the hot melt matrix and not just on a surface of the hot melt or not just to a certain depth of the hot melt. The hot melt matrix additionally provides a connective matrix by which to keep the coating together when the superabsorbent polymer powders expand upon contacting water.

In some embodiments, the SA-SHM coatings used are physically setting thermoplastic materials. For example, these may include commercially available water-swellable hot melt adhesives such as HM002 and HM008B (available from Stewart Superabsorbents, Hickory, N.C.), Technomelt AS 4415 (also known as Macromelt Q 4415 available from Henkel Corp., Madison Heights, Mich.), and NW1117 and NW1120B (Hydrolock® super absorbent thermoplastic available from H. B. Fuller Company, Vadnais Heights, Minn.).

Additionally, a variety of exemplary compositions are provided in the following paragraphs. According to one embodiment, the SA-SHM coating includes essentially three components that are mixed homogenously. The first component is a water-insoluble component containing at least one water-insoluble polymer or copolymer and at least one other substantially water-insoluble resin. For example, the first component can be selected from polyamides, copolyamides, polyaminoamides, polyesters, polyacrylates, polymethacrylates, polyolefins and ethylene/vinyl acetate (EVA) copolymers. Further the first component can be mixtures of one or more of the foregoing polymers. The second component is a water-soluble or water-dispersible component containing at least one water-soluble or water-dispersible oligomer and/or polymer or copolymer. For example, the second component can be selected from polyethylene glycols with molecular weights of 400 to 20,000, polyvinyl methyl ether, polyvinyl pyrrolidone, copolymers of vinyl methyl ether or vinyl pyrrolidone, polyvinyl alcohols, water-soluble or water-dispersible polyesters or copolyesters, and water-soluble or water-dispersible acrylate polymers.

The third component is a water-swellable component (i.e., a superabsorbent polymer) consisting of a water-swellable homopolymer or copolymer. For example, the third component can be selected from any homopolymers and/or copolymers which, as hydrophilic materials, are capable of absorbing and retaining large amounts of water, even under pressure, without immediately dissolving in the water, including, for example, graft copolymers of starch or cellulose with acrylonitrile, acrylic acid or acrylamide, carboxymethyl cellulose, maleic anhydride/poly-α-olefin copolymers, polyacrylamide, polyacrylic acid and salts of polyacrylic acid, and, optionally, copolymers of acrylic acid or acrylamide with acrylate esters. In embodiments, other suitable the third components include homopolymers and copolymers of acrylic acid or methacrylic acid, acrylonitrile or methacrylonitrile, acrylamide or methacrylamide, vinyl acetate, vinyl pyrrolidone, maleic acid, maleic anhydride, itaconic acid, itaconic anhydride, vinyl sulfonic acid or hydroxyalkyl esters of such acids, 0 to 95% by weight of the acid groups being neutralized with alkali or ammonium groups and these polymers/copolymers are crosslinked by means of polyfunctional compounds. Graft copolymers of starch or cellulose with the above comonomers can also be used in certain embodiments. Still other suitable superabsorbent polymers include crosslinked acrylate polymers, crosslinked products of vinyl alcohol-acrylate copolymers, crosslinked products of polyvinyl alcohols grafted with maleic anhydride, cross-linked products of acrylate-methacrylate copolymers, crosslinked saponification products of methyl acrylate-vinyl acetate copolymers, crosslinked products of starch acrylate graft copolymers, crosslinked saponification products of starch acrylonitrile graft copolymers, crosslinked products of carboxymethyl cellulose polymers, and crosslinked products of isobutylene-maleic anhydride copolymers.

In some embodiments, the SA-SHM also includes a tackifying resin or resins to increase the tackiness of the melt. In particular embodiments, various colophony derivatives, i.e., in particular the resin esters of abietic acid, are used for the tackifying resin; although, in other embodiments, other polyterpenes and terpene/phenol resins are used. Other colophony derivatives include colophony esters of various mono- and poly-functional alcohols. Additionally, suitable tackifying resins include wood rosin, tall oil rosin, tall oil derivatives, gum rosin, rosin ester resins, natural terpenes, synthetic terpenes, and petroleum based tackifying agents, including, e.g., aliphatic, aromatic and mixed aliphatic-aromatic petroleum based tackifying resins. Still further, other suitable tackifying resins include, e.g., alpha-methyl styrene resins, branched and unbranched $C_5$ resins, $C_9$ resins and $C_{10}$ resins, styrenic and hydrogenated modifications thereof, and combinations thereof.

In particular embodiments, the SA-SHM coating contains the following components: 15 to 45% by weight of resin esters or terpene/phenol resins; 15 to 40% by weight of thermoplastic copolymer, more particularly ethylene/vinyl acetate copolymer; 5 to 20% by weight of acrylate copolymers; 5 to 30% by weight of polyethylene glycols; 5 to 15% by weight of polyvinyl ethyl ethers, water-soluble or water-dispersible acrylate polymers or water-soluble or water-dispersible copolyesters; 15 to 50% by weight of powder-form polyacrylic acid salt, polyacrylamide or similar powdered superabsorbent polymer; and 0.2 to 2.0% by weight of stabilizers, such as, for example, antioxidants based on sterically hindered phenols, that enhance the temperature stability of the compositions.

In other particular embodiments, the SA-SHM contains the following components: 15 to 45% by weight of resin esters, terpene/phenol resins or the like; 15 to 40% by weight of thermoplastic polymer or copolymer, more particularly ethylene/vinyl acetate copolymer; 5 to 25% by weight of polyethylene glycols; 15 to 50% by weight of a powdered superabsorbent polymer, more particularly polyacrylic acid salt; 0.2 to 2.0% by weight of a stabilizer; and 0.5 to 5.0% by weight of waxes, more particularly ethylene bis-stearamide.

In another embodiment of a suitable SA-SHM coating composition, the SA-SHM coating is comprised of 10 to 25% by weight of at least one tackifying resin, 20 to 40% by weight of at least one water-dispersible EVA wax, 5 to 25% by weight of at least one ethylene/acrylic acid copolymer, 15 to 35% by weight of at least one water-soluble homopolymer or copolymer, and 20 to 40% by weight of at least one powdered superabsorbent polymer having an average particle size of less than 80 microns.

The tackifying resins can be selected from the same group of tackifying resins discussed above. The water-dispersible EVA waxes are selected from polyethylene waxes based on an ethylene/vinyl acetate copolymer having a vinyl acetate content of up to 15% and molecular weights of between 500 and about 10,000. Flexibilizing ethylene copolymers, particularly ethylene/alkyl acrylate copolymers having an alkyl acrylate proportion of 15 to 40% by weight, are suitable as hydrophobic matrix components for binding the powdered superabsorbent polymer. Longer-chain alkyl acrylic esters are particularly suitable as comonomers in this respect, particularly the $C_4$-$C_{12}$ alkyl acrylates.

The water-soluble homopolymer or copolymer can include polyethylene glycol, ethylene oxide/propylene oxide copolymers (either as block copolymers or as random copolymers having a predominate proportion of ethylene oxide), polyvinyl methyl ether, polyvinyl pyrrolidone, polyvinyl alcohol, and copolymers of such monomers with other olefinically unsaturated monomers. In embodiments, these water-soluble polymers have molecular weights of between 1000 and 20,000, they may be liquid at room temperature, or they may be solid and waxy in cases where higher molecular weights are used. Suitable powdered superabsorbent polymers include those listed above.

In still another embodiment, the SA-SHM is comprised of 1% to 25% by weight of a block copolymer, 45% to 75% by weight of a powdered superabsorbent polymer, 15% to 40% by weight of a plasticizing oil, and optionally 1% to 5% by weight of a surfactant. Suitable block copolymers include linear and radial copolymer structures having the formula (A-B)x or A-B-A, where block A is a polyvinylarene block, block B is a poly(monoalkenyl) block, and x is an integer of at least 1. Suitable block A polyvinylarenes include, e.g., polystyrene, polyalpha-methylstyrene, polyvinyltoluene and combinations thereof. Suitable B blocks include, e.g., conjugated diene elastomers including, e.g., polybutadiene and polyisoprene, hydrogenated elastomers, ethylene/butylene (hydrogenated butadiene) and ethylene/propylene (hydrogenated isoprene), and combinations and mixtures thereof. Suitable powdered superabsorbent polymers include those listed above.

Suitable plasticizing oils include, e.g., hydrocarbon oils low in aromatic content, mineral oil. In a particular embodiment, the plasticizing oils are paraffinic or naphthenic. In some embodiments, the SA-SHM can also include tackifying agents, such as those listed above, up to 40% by weight.

In an embodiment, the SA-SHM coating includes at least one of sodium or potassium sodium acrylate or acrylamide copolymers, cross-linked carboxymethylcellulose, ethylene maleic anhydride copolymers, cross-linked polyethylene oxide, polyvinyl alcohol copolymers, or starch-grafted copolymers of polyacrylonitrile.

Referring to each of the above described SA-SHM coating compositions, in embodiments, the average particle size of the superabsorbent polymer powders is between 1 micron and 100 microns. Broadly, in embodiments, the average particle size of the superabsorbent polymer powder is less than or equal to 80 microns. In other embodiments, the average particle size of the superabsorbent polymer powders is less than or equal to 50 microns. In still other embodiments, the average particle size of the superabsorbent polymer powders is less than or equal to 38 microns, and in yet other embodiments, the average particle size of the superabsorbent polymer powders is less than or equal to 25 microns. Further, in embodiments, the average particle size of the superabsorbent polymer powders is greater than 1 micron, and in other embodiments, the average particle size of the superabsorbent polymer powders is greater than 10 microns. Additionally, in embodiments, less than 50% of the superabsorbent polymer powder particles have a maximum outer dimension≥50 microns. In still other embodiments, less than 10% of the superabsorbent polymer powder particles have a maximum outer dimension≥38 microns, and in yet other embodiments, less than 10% of the superabsorbent polymer powder particles have a maximum outer dimension≥25 microns. Further, in embodiments, the superabsorbent polymer powders have particles that are spherical in shape.

Additionally, in some embodiments, low-smoke, zero halogen (LSZH) and/or other fire retardant additives are added to the SA-SHM. Exemplary fire retardant additives include aluminum trihydrate, magnesium hydroxide, smoke suppressant molybdenum-based particles, ammonium polyphosphate, and pentaerythritol.

As mentioned above, the SA-SHM coating can be applied to the inner surface 14 of the cable jacket 12, to the exterior or interior surface of the buffer tubes 22, and/or to the optical fibers 20. The SA-SHM can be applied to these surfaces via a variety of application methods. In exemplary embodiments, the SA-SHM is applied to the jacket 12, buffer tubes 22, and/or optical fibers 20 by atomizing, fiberizing, dip coating, spray, or by co-extrusion (e.g., extruding the coating 30 at the same time as the cable jacket 12, buffer tube 22, and/or jacket for the optical fiber 20). Thus, the multitude of different application methods provides low cost and flexible manufacturing. Further, the components of the optical fiber cables can be coated at different stages in the manufacturing process, thereby enabling more options for custom manufacturing. Further, the application of the SA-SHM coating is not limited with respect to buffer tube or cable length (i.e., the SA-SHM coating can continuously be applied to the cable component regardless of the length of that component).

Figure 3A:
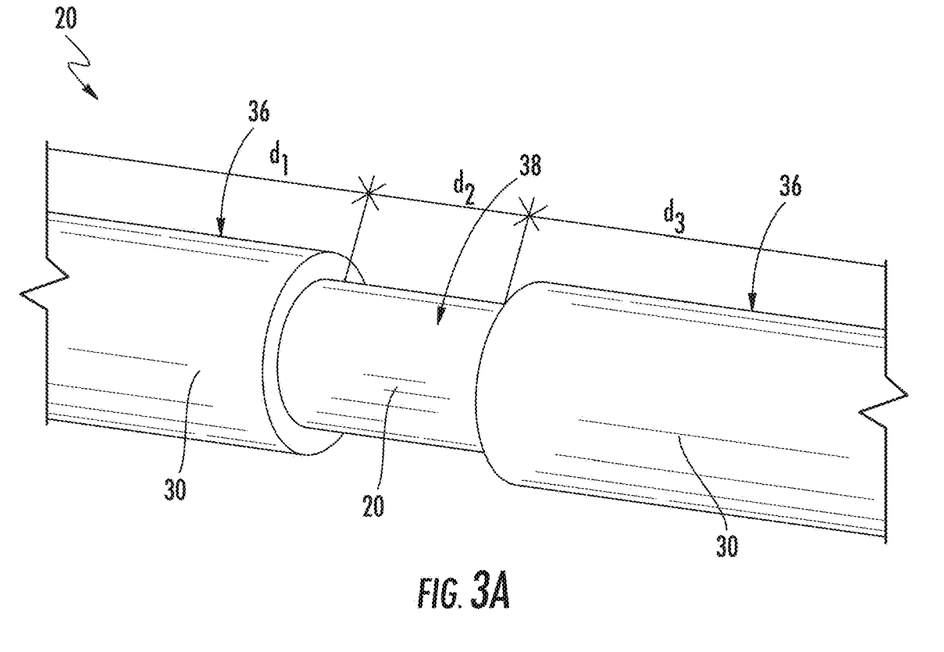
FIG. 3A is a partial isometric view of an optical fiber with a coating of SA-SHM that is discontinuous along its length, according to an exemplary embodiment.

Indeed, in embodiments, the SA-SHM coating 30 is applied continuously along the entire length or at least a substantial portion of the entire length of the cable jacket 12, buffer tube 22, and/or optical fiber 20. However, in another embodiment, the coating 30 is applied discontinuously. In an exemplary embodiment shown in FIG. 3A, the coating 30 is applied discontinuously along the length of an optical fiber 20 (while not depicted, the coating 30 can also be applied discontinuously along the length of the cable jacket 12 and/or buffer tube 22). As can be seen, the optical fiber 20 has alternating coated sections 36 and uncoated sections 38 (only one uncoated section 38 is depicted in FIG. 3A). The first coated section 36 has a length $d_1$, followed by an uncoated section 38 having a length $d_2$, which is followed by another coated section 36 having a length $d_3$. In embodiments, the lengths $d_1$, $d_2$, and $d_3$ are the same length; however, in other embodiments, the lengths $d_1$, $d_2$, and $d_3$ are different lengths. Further, in embodiments, the lengths $d_1$ and $d_3$ of the coated sections 36 can be the same length, which is different than the length $d_2$ of the uncoated section. In embodiments, the lengths $d_1$, $d_2$, and $d_3$ are all between 1 mm and 500 mm in length. In another embodiment, the lengths $d_1$, $d_2$, and $d_3$ are all between 1 mm and 100 mm in length.

Figure 3B:
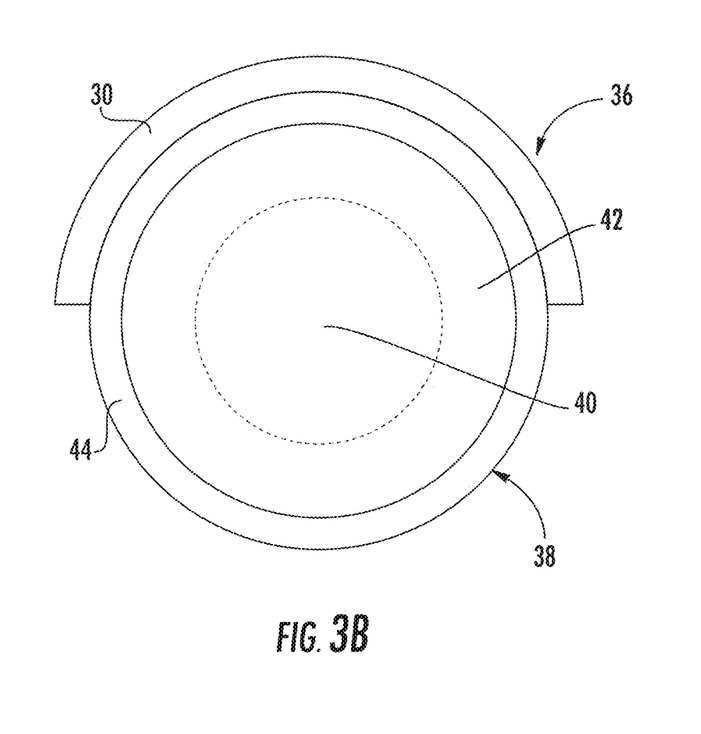
FIG. 3B is a cross-sectional view of an optical fiber with a coating of SA-SHM that is discontinuous around its circumference, according to an exemplary embodiment.

Additionally, the SA-SHM coating 30 can be applied discontinuously around the interior circumferential surface of the cable jacket 12, discontinuously around the exterior or interior circumferential surface of the buffer tube 22, and/or discontinuously around the exterior circumferential surface of the optical fiber 20. FIG. 3B provides an exemplary embodiment of an optical fiber 20 with a discontinuous coating 30 (while not depicted, the coating 30 can also be applied discontinuously around the inner circumference of the cable jacket 12 and/or buffer tube 22). As can be seen in the cross-sectional view of the embodiment depicted in FIG. 3B, the optical fiber 20 includes a core region 40 along which optical signals travel, a cladding region 42 that keeps the optical signals substantially within the core region 40, and an optical fiber jacket 44. In the embodiment depicted, the coating 30 is applied over the optical fiber jacket 44; however, in other embodiments, the coating 30 can be applied on the exterior surface of the cladding region 42. As shown in FIG. 3B, the optical fiber 20 has a coated section 36 and an uncoated section 38. In embodiments, the coated section 36 covers between 5% and 75% of the circumference of the optical fiber 20. In another embodiment, the coated section 36 covers between 5% and 50% of the circumference of the optical fiber 20, and in still another embodiment, the coated section 36 covers between 5% and 25% of the circumference of the optical fiber 20.

In still another embodiment, the coating 30 is discontinuous along the length and around the circumference of the interior surface of the cable jacket 12, the exterior or interior surface of the buffer tube 22, and/or the optical fiber 20.

Figure 4:
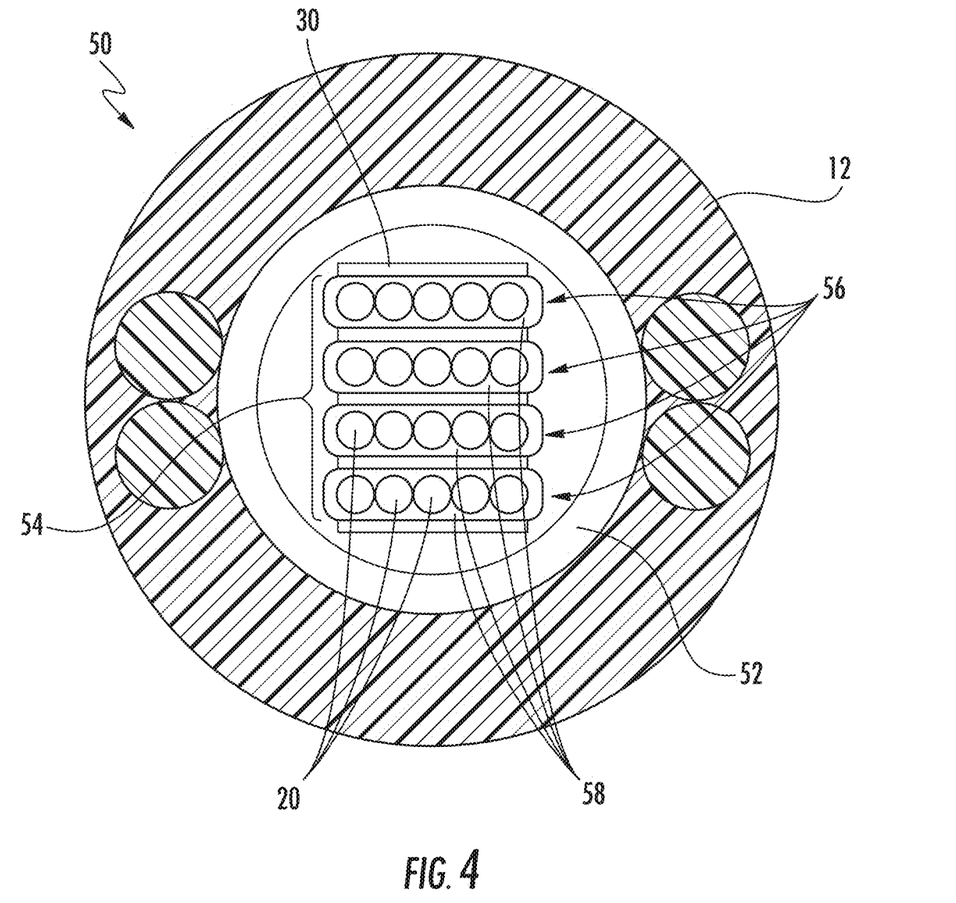
FIG. 4 is a cross-sectional view of an optical fiber cable with the optical fibers arranged in ribbons, each ribbon having a coating of SA-SHM, according to an exemplary embodiment.

Additionally, in another embodiment, the coating 30 is applied in an optical fiber ribbon cable 50. Referring to FIG. 4, an optical fiber ribbon cable 50 is shown according to an exemplary embodiment. Cable 50 is substantially the same as cable 10 (as shown in FIG. 1) except as discussed herein. As shown in FIG. 4, cable 50 includes a single buffer tube 52, and a stack 54 of a plurality of optical fiber ribbons 56. Each optical fiber ribbon 56 includes a plurality of optical fibers 20 surrounded by and supported by a polymeric matrix 58. In various embodiments, cable 50 includes at least four ribbons within stack 54 and each ribbon 56 supports four optical fibers 20. Similar to the previous embodiments, the SA-SHM coating 30 is applied to at least one of the following locations within the cable 50: at least partially along the length of at least one of the optical fiber ribbons 56 in the buffer tube 52, at least partially along the length of the exterior or interior surface of the buffer tube 52, or at least partially along the length of the interior surface of the cable jacket 12. Additionally, in embodiments similar to those previously described, the SA-SHM coating 30 is applied discontinuously along the length of the ribbon 56 and/or discontinuously along the length and/or around the circumference of the inner surface of the cable jacket 12 and/or buffer tube 52.

Tables 1-3, below, provide examples of the water absorption capabilities of four SA-SHM (referred to individually as "SHM1," "SHM2," "SHM3," and "SHM4") that can be used as the coatings according to exemplary embodiments. Certain SA-SHM capabilities are compared against a standard SAP powder (referred to as "SAP1"). In particular, SHM1 is commercially available as NW1117 from H.B. Fuller Company, Vadnais Heights, Minn. SHM2 is commercially available as NW1120B from H.B. Fuller Company, Vadnais Heights, Minn. SHM3 is commercially available as HM002 from Stewart Superabsorbents, Hickory, N.C. SHM4 is commercially available as HM008 from Stewart Superabsorbents, Hickory, N.C. SAP1 is a powderized sodium acrylate polymer having particles with average size of about 63 microns (commercially available from Stewart Superabsorbents, Hickory, N.C.). All experiments were performed at room temperature of about 22° C.

The data displayed in Table 1 demonstrates the water absorption capacities of SHM1 and SHM2 as compared to SAP1. In particular, particles of SAP1 and sections of SHM1 and SHM2 were placed in a beaker. The masses of each beaker before and after the addition of SAP1, SHM1, and SHM2 were determined so as to calculate the amount of each material added. A filter as then placed over the beaker, and the mass of the beaker/material/filter combination was determined. Water was added to the beaker, and the materials were given time to absorb as much water as they could. Any remaining, unabsorbed water was drained from the beaker, and the mass of the beaker/material/filter/absorbed water was determined. As can be seen from Table 1, SHM1 and SHM2 absorbed more water on a per gram basis than SAP1.

TABLE 1

Water absorption capacity of SHM Materials compared to SAP Powder

| Material | SAP1 | SHM2 | SHM1 |
|---|---|---|---|
| Mass of Beaker + Stir Bar (g) | 129.70 | 70.10 | 136.15 |
| Mass of Beaker + Stir Bar + SHM Material (g) | 129.84 | 70.23 | 136.32 |
| Mass of SHM Material (g) | 0.14 | 0.13 | 0.17 |
| Mass of Beaker + Filter Assembly (g) | 156.80 | 157.05 | 150.62 |
| Mass of Beaker + Filter Assembly + Swollen Gel (g) | 181.64 | 179.24 | 180.56 |
| Mass of Water Absorbed (g) | 24.69 | 22.05 | 29.76 |
| Mass of Water Absorbed/Mass of SHM Material (g/g) | 165.69 | 167.81 | 175.06 |

The data displayed in Table 2 demonstrates the water absorption capacities of SHM3 and SHM4 as compared to SAP1. In this experiment, the materials were placed on a glass slide. Each of the glass slides were weighed before and after the materials were placed thereon to determine the mass of each material deposited. Water was then added dropwise on the materials over a time up to 10 minutes and until it was visually observed that the material was saturated and the extra water dripped off. The glass slides with gelled material were then weighed to determine the amount of water absorbed. As can be seen in Table 2, SHM3 and SHM4 performed as well or better than SAP1 in terms of water absorbed on a per gram basis.

TABLE 2

Water absorption capacity of SHM materials in experiments of films on glass slide

| Material | SHM3 | SHM4 | SAP1 |
|---|---|---|---|
| Mass of Glass Slide (g) | 9.272 | 9.263 | 9.263 |
| Mass of Glass Slide + Material (g) | 9.347 | 9.348 | 9.348 |
| Mass of Glass Slide + Gelled Material (g) | 19.468 | 19.650 | 19.650 |
| Mass of Material (g) | 0.075 | 0.085 | 0.082 |
| Mass of Water Absorbed (g) | 10.121 | 10.302 | 10.305 |
| Mass of Water Absorbed/Mass of Gelled Material (g/g) | 135.66 | 121.06 | 125.67 |

The results of a third experiment are provided in Table 3. In this experiment, SHM3 was coated onto an optical fiber. The optical fiber was taped to a glass slide, and SHM3 was applied over the optical fiber. The mass of the optical fiber and glass slide was determined before and after SHM3 was applied. Water was then introduced to the coated optical fiber, and the mass of the water absorbed was determined. As can be seen in Table 3, SHM3 performed as well when coating the optical fiber as when it was by itself on the glass slide.

TABLE 3

Water absorption capacity of SHM material film on an optical fiber

| SHM Material | SHM3 |
|---|---|
| Mass of Glass Slide (g) | 9.2518 |
| Mass of Glass Slide + Taped Fiber (g) | 9.2905 |
| Mass of Glass Slide + Taped Fiber + SHM (g) | 9.3075 |
| Mass of Glass Slide + Taped Fiber + SHM + Water (g) | 11.6125 |
| Mass of SHM Material (g) | 0.017 |
| Mass of Water Absorbed (g) | 2.305 |
| Mass of Water Absorbed/Mass of SHM Material (g/g) | 135.59 |

Figure 5:
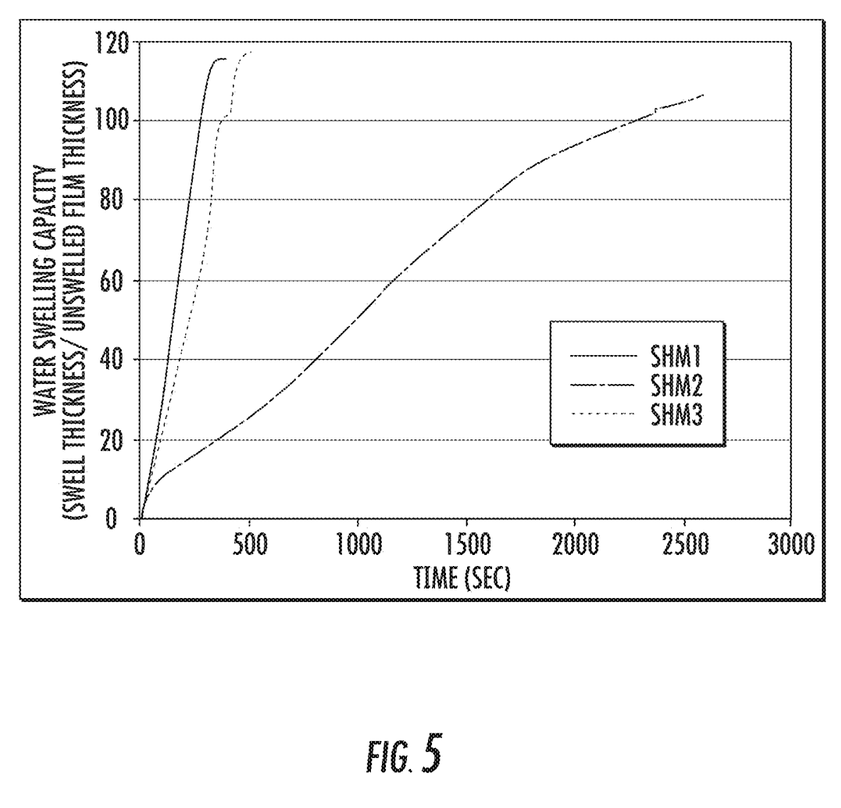
FIG. 5 is a graph representing the water swelling capacity of three SA-SHM as a function of time, according to an exemplary embodiment.

FIG. 5 provides a graph of the water swelling capacity of SHM1, SHM2, and SHM3. In this instance, the water swelling capacity was measured in terms of the increase in thickness as compared to the original thickness of the SA-SHM film. As can be seen from the graph of FIG. 5, SHM1, SHM2, and SHM3 each increased in thickness by more than 100 times their original thicknesses. Further, SHM1 and SHM3 exhibited a faster absorption rate than SHM2. Generally, a faster absorption rate is more advantageous for optical fiber cable applications.

Advantageously, embodiments of the optical fiber cable using the SA-SHM coating on at least one surface or component therein provide the benefit of reducing microbending losses (and thereby optical fiber attenuation) as compared to SAP powders, especially in small size optical fiber cable designs. Further, the reduction in microbending can allow for lower cost, more compact cable designs. Moreover, using the SA-SHM coating prevents sticking of the optical fibers to the buffer tubes and/or of the buffer tubes to the jacket in contrast to some optical fiber cables that use of SAP gels as a means of water absorption. Additionally, lower cost water-blocking functionality can be provided through the enhanced control of the quantity of SA-SHM used through the length of the cable as compared to SAP coated polyester tapes and yarns and SAP powders. In accordance with yet other aspects of the present disclosure, the SA-SHM can be selectively applied to, for example, the interstices spaces in a cable such that attenuation losses may be further reduced.

Indeed, optical fiber cables having a small form factor, such as those provided by embodiments of the SA-SHM coated optical fiber cables disclosed herein, allow higher fiber density cable installations and help overcome duct congestion issues. Additionally, the cost of such optical fiber cables tends to be lower because of the lower material cost and because they facilitate larger installed lengths during blowing of cables in ducts/micro-ducts.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
a cable jacket having an exterior surface and an interior surface;
at least one buffer tube, wherein each of the at least one buffer tube has an exterior surface and an interior surface, wherein each of the at least one buffer tube surrounds a plurality of optical fibers, and wherein the cable jacket surrounds the at least one buffer tube;
wherein a coating of superabsorbent, swellable hot melt is applied to at least one of the following locations:
  (i) along at least a portion of the length of at least one of the plurality of optical fibers; or
  (ii) along at least a portion of the length of the exterior or interior surface of the at least one buffer tube;
wherein the superabsorbent, swellable hot melt is capable of absorbing at least 50 g of water per gram of superabsorbent, swellable hot melt; and
wherein the coating of superabsorbent, swellable hot melt has alternating sections of the coating separated from each other by uncoated portions along the length of the optical fiber or of the buffer tube.

2. The optical fiber cable of claim 1, wherein the sections of the coating and the uncoated portions each have a length of between 1 mm and 100 mm.

3. The optical fiber cable of claim 1, wherein the plurality of optical fibers is N optical fibers;
wherein each buffer tube has an outside diameter D1;
wherein each optical fiber has an outside diameter D2 such that D2 is less than 210 microns and greater than 100 microns; and
wherein the N optical fibers are densely packed within each buffer tube such that a diameter ratio parameter, $\Omega$, is defined as the ratio D1/D2, and is $2.25+0.143(N) \leq \Omega \leq 1.14+0.313(N)$.

4. The optical fiber cable of claim 1, wherein the coating of superabsorbent, swellable hot melt has a thickness $t_{hm}$ that is 1 micron $\leq t_{hm} \leq$ 200 microns.

5. The optical fiber cable of claim 1, wherein the coating of superabsorbent swellable hot melt comprises superabsorbent polymer powder particles having an average diameter of >1 micron and <100 microns.

6. The optical fiber cable of claim 5, wherein less than 50% of the superabsorbent polymer powder particles have a maximum outer dimension≥50 microns.

7. The optical fiber cable of claim 5, wherein less than 10% of the superabsorbent polymer powder particles have a maximum outer dimension≥38 microns.

8. The optical fiber cable of claim 1, wherein the cable further includes at least one flame retardant additive.

9. The optical fiber cable of claim 8, wherein the at least one flame retardant additive comprises at least one of aluminum trihydrate, magnesium hydroxide, smoke suppressant molybdenum-based particles, ammonium polyphosphate, or pentaerythritol.

10. The optical fiber cable of claim 1, wherein the coating of superabsorbent, swellable hot melt comprises at least one of sodium or potassium sodium acrylate or acrylamide copolymers, cross-linked carboxymethylcellulose, ethylene maleic anhydride copolymers, cross-linked polyethylene oxide, polyvinyl alcohol copolymers, or starch-grafted copolymers of polyacrylonitrile.

11. The optical fiber cable of claim 1, wherein the plurality of optical fibers are one of loose optical fibers or optical fibers bound by a ribbon matrix.

12. The optical fiber cable of claim 1, wherein each of the plurality of optical fibers comprises a glass core, a cladding, and a layer of non-superabsorbent polymer that surrounds the cladding;
wherein the coating is applied to the at least one of the plurality of optical fibers; and
wherein an inner surface of the coating of the superabsorbent, swellable hot melt contacts an outer surface of the layer of non-superabsorbent polymer.

13. An optical fiber cable comprising:
a cable jacket having an exterior surface and an interior surface;
at least one buffer tube, wherein each of the at least one buffer tube has an exterior surface and an interior surface, wherein each of the at least one buffer tube surrounds a plurality of optical fibers, and wherein the cable jacket surrounds the at least one buffer tube;
wherein a coating of superabsorbent, swellable hot melt is applied to at least one of the following locations:
  (i) along at least a portion of the length of at least one of the plurality of optical fibers;
  (ii) along at least a portion of the length of the exterior or interior surface of the at least one buffer tube; or
  (iii) along at least a portion of the length of the interior surface of the cable jacket;
wherein the superabsorbent, swellable hot melt is capable of absorbing at least 50 g of water per gram of superabsorbent, swellable hot melt; and
wherein each of the plurality of optical fibers comprises a glass core, a cladding, and a layer of non-superabsorbent polymer that surrounds the cladding;
wherein the coating is applied to the at least one of the plurality of optical fibers; and
wherein an inner surface of the coating of the superabsorbent, swellable hot melt contacts an outer surface of the layer of non-superabsorbent polymer.

* * * * *